Figure 1:
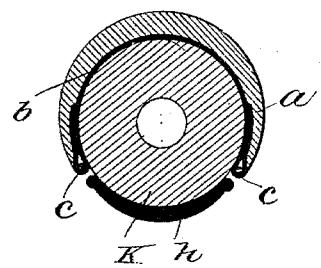

(No Model.)

C. K. WELCH.
TIRE FOR VEHICLES.

No. 562,869. Patented June 30, 1896.

Witnesses
John Annie
Dennis Sumby.

Inventor
Chas. K. Welch.
By James L. Norris
His Attorney

UNITED STATES PATENT OFFICE.

CHARLES KINGSTON WELCH, OF COVENTRY, ENGLAND, ASSIGNOR TO THE PNEUMATIC TYRE COMPANY, LIMITED, OF DUBLIN, IRELAND.

TIRE FOR VEHICLES.

SPECIFICATION forming part of Letters Patent No. 562,869, dated June 30, 1896.

Application filed January 30, 1894. Serial No. 498,487. (No model.) Patented in England September 16, 1890, No. 14,563; in France February 5, 1892, No. 219,167; in Belgium February 5, 1892, No. 98,225; in Canada October 11, 1892, No. 40,630; in Denmark November 16, 1892, No. 3,318; in South Australia November 21, 1892, No. 2,360; in Victoria November 22, 1892, No. 10,155; in New South Wales November 23, 1892, No. 4,135; in Queensland November 24, 1892, No. 2,244; in New Zealand February 1, 1893, No. 6,019; in Austria-Hungary April 22, 1893, No. 1,156, and in Italy October 18, 1893, XXVII, 32,810.

*To all whom it may concern:*

Be it known that I, CHARLES KINGSTON WELCH, engineer, a subject of the Queen of Great Britain, residing at Coventry, England, have invented certain new and useful Improvements in Tires for Vehicles, (for which I have obtained patents in Great Britain, No. 14,563, dated September 16, 1890; in France, No. 219,167, dated February 5, 1892; in Belgium, No. 98,225, dated February 5, 1892; in Austria-Hungary, tom. 43, fol. 1,156, dated April 22, 1893; in Italy, Vol. XXVII, No. 32,810, dated October 18, 1893; in Denmark, No. 3,318, dated November 16, 1892; in Canada, No. 40,630, dated October 11, 1892; in Victoria, No. 10,155, dated November 22, 1892; in New South Wales, No. 4,135, dated November 23, 1892; in South Australia, No. 2,360, dated November 21, 1892; in New Zealand, No. 6,019, dated February 1, 1893, and in Queensland, No. 2,244, dated November 24, 1892,) of which the following is a specification, reference being had to the drawings accompanying and forming a part of the same.

The invention subject of my present application is an improvement in elastic tires for cycle and other wheels; and it consists in the combination with a wheel-rim of a U-shaped cover of india-rubber or of india-rubber and a textile fabric united together, which is applied to and incloses or covers the outer or tread portion of the rim, and which is provided with reinforced non-extensible edges of a circumference less than that of the said rim at or along its tread portion, and over which the tire is applied.

The object of the invention is to provide an elastic jacket or wearing cover that may be readily applied to or detached from bicycle and similar wheels, whether the rim of the same be hollow or solid, and whether composed entirely of rigid materials or partly of rigid and partly elastic materials, provided only that the portion of the wheel which, for purposes of this case, I designate as the "rim" be of proper conformation to receive and retain the said cover or tire.

The improvement is shown in the accompanying drawings.

Figure 2:
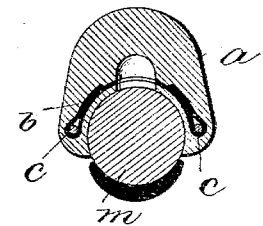
Figure 3:
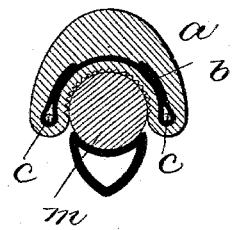
Figure 4:
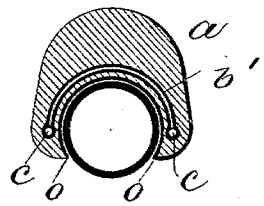
Figure 5:
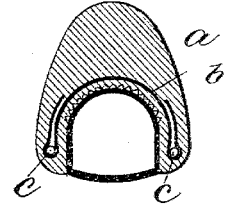
Figure 6:
Figure 7:

Figure 1 is a sectional view of one of the forms or applications of my invention. Fig. 2 is a similar view of a modification of the same. Fig. 3 is a cross-section illustrating a modification in the tire. Figs. 4 and 5 are sections illustrating the improvement as applied to special rims. Figs. 6 and 7 are enlarged views of devices for connecting the ends of the wires.

In the figures, $a$ is my improved jacket or cover, formed of rubber, having a lining or insertion of canvas $b$, which is folded back upon itself to form continuous annular loops, affording spaces for the reinforcing-wires $c\ c$. Each wire may be made continuous by brazing the ends together, or the ends can be drawn together by means of a nut $d$ with a right-hand screw threaded on one end of the wire $e$ and a left-hand screw threaded on the other end $e'$, (shown in Fig. 6,) or by means of a threaded sleeve $d'$, Fig. 7, attached to the end $e$ of the wire, upon which is formed a head $e^2$, the other end $e'$ of the wire having a thread formed thereon, or a number of coils may be used formed of one continuous wire or several wires grouped together, the ends being united by brazing. I may also use for reinforcing the edges of the cover a core or cores, made of other suitable material instead of metal wires, all hereinafter included in the term "wire."

My improved cover may be utilized by fitting the same over the tread portion and exteriorly of any suitable rim, whether solid or hollow, rigid or partly elastic. In Fig. 1 the jacket $a$ is shown applied to what may be considered as a rim, although in reality it is composed of a hollow rubber tube K, seated in a grooved metal rim $h$. When thus applied, my improved cover serves not so much to afford an elastic bearing-surface as to prevent splitting and cutting of the material over which it is applied, and affords an additional security against displacement of the elastic portion of the rim.

To place the tire over a rim, the ends of the reinforcing-wires may be disconnected and after the tire is in position drawn together, or in case the ends of the wires are brazed, the tire, when the character of the rim permits, may be worked over the rim in the well-understood manner. When once in position, there is little liability of displacement.

The applicability of my improved jacket to rims having solid elastic portions or treads *m m* is illustrated in Figs. 2 and 3, to the tread portion of which rims they may be cemented for greater security. The tire *a*, (shown in Fig. 2,) has a single annular recess or groove formed therein, while in Fig. 3 a number of recesses or channels are shown. By this means a better cushioning effect is secured, vibration lessened, and weight reduced.

In Figs. 4 and 5 the tires are shown as applied to rigid rims or fellies. In this case, as the only elasticity is in the jacket or cover itself, the latter is suitably thickened in the crown or tread to better secure that purpose.

Fig. 4 shows the application of the invention to a rim circular in section, a portion of the circumference being covered with canvas from *o* to *o* to increase the gripping qualities of the jacket or cover. The canvas lining B' is formed double by being made tubular previously to the rubber cover being vulcanized around the tube or lining *b'*. The wires *c c* are next inserted, the canvas tube *b'* is then flattened, and the rubber material formed upon it.

In Fig. 5 a rim of D section is shown, having a cover of the kind described fitted to its tread portion.

It will be seen that, strictly speaking, the jacket or cover *a*, above described, constitutes in my invention a tire proper as distinguished from the jacket or cover as these terms are usually applied in the case of pneumatic and similar composite tires, and that the hollow or solid elastic bands with the grooved rims, or the rounded metal rims constitute, when the cover is applied to them in the manner described, what, for the purposes of this invention, may be properly considered as constituting and termed the "rim," either elastic or rigid, simple or composite, as the case may be, and in the claims herein, in order to distinguish my invention, I use the term "rim" in the sense which I have indicated.

This improved cover, whether applied to a rim partly elastic or composed wholly of rigid material, is free to expand laterally, and therefore affords a very elastic means of support by contact with the ground, and greatly absorbs and greatly reduces vibration.

I am aware that arched tires have been used, also that wires and other cores have been applied in various ways, also that a tire and rim similar in form to those shown in Fig. 4 have been used, but without the reinforcing-wires in the edges of the tire, so that the latter was secured to the rim by cement only or by shrinking, and I do not claim such constructions without the reinforcing-wires, which in practice require for good results the canvas lining also.

What I claim is—

1. The combination with the rim of a wheel, substantially such as described, of a cover of india-rubber applied over the same and having reinforced non-extensible gripping portions along the outer sides of the rim and of less diameter than the outer portions of the rim to which they are applied, they being not otherwise attached or held to the rim, as set forth.

2. The combination with the rim of a wheel, of the kind described, of an arched cover composed of india-rubber and a textile fabric applied around the exterior of the rim, and wires contained in loops in the fabric at the edges of the cover, the ends of said wires being connected to form rings or loops of less diameter than the outer portion of the rim to which the wired portions of the cover are applied, the said wired portions being not otherwise attached or held to the rim, as set forth.

3. The combination with the rigid rim of a wheel of an arch-shaped cover of elastic material covering the same and formed with one or more recesses or channels on its under side, and having reinforced non-extensible portions lying along the sides of said rim exteriorly but not fixed or attached thereto, as set forth.

In testimony whereof I have hereunto set my hand this 8th day of January, 1894.

CHARLES KINGSTON WELCH.

Witnesses:
FREDERICK WILLIAM LE TALL,
THOMAS LAKE.